United States Patent
Rass et al.

(10) Patent No.: US 8,005,428 B2
(45) Date of Patent: Aug. 23, 2011

(54) ARRANGEMENT OF DEVICES COMPRISING AT LEAST ONE TRANSMITTER AND METHOD FOR IMPROVING THE RECEIVING FIELD STRENGTH

(75) Inventors: Uwe Rass, Nürnberg (DE); Jürgen Reithinger, Neunkirchen am Brand (DE)

(73) Assignee: Siemens Audiologische Technik GmbH, Erlangen (DE)

( * ) Notice: Subject to any disclaimer, the term of this patent is extended or adjusted under 35 U.S.C. 154(b) by 685 days.

(21) Appl. No.: 12/214,209

(22) Filed: Jun. 17, 2008

(65) Prior Publication Data

US 2008/0318526 A1    Dec. 25, 2008

Related U.S. Application Data

(60) Provisional application No. 60/936,615, filed on Jun. 21, 2007.

(30) Foreign Application Priority Data

Jun. 20, 2007    (DE) .......................... 10 2007 028 234

(51) Int. Cl.
*H04B 7/00*    (2006.01)
*H04B 1/034*    (2006.01)

(52) U.S. Cl. ................. 455/41.2; 455/41.1; 455/100
(58) Field of Classification Search .............. 455/41.1, 455/41.2, 91, 100, 39, 73, 575.1, 575.7
See application file for complete search history.

(56) References Cited

U.S. PATENT DOCUMENTS

| | | | | |
|---|---|---|---|---|
| 5,437,057 A | * | 7/1995 | Richley et al. | 455/41.1 |
| 5,568,516 A | * | 10/1996 | Strohallen et al. | 375/259 |
| 5,771,438 A | * | 6/1998 | Palermo et al. | 455/41.1 |
| 6,424,820 B1 | * | 7/2002 | Burdick et al. | 455/41.1 |
| 7,831,205 B2 | * | 11/2010 | Jack et al. | 455/40 |

* cited by examiner

*Primary Examiner* — Sonny Trinh

(57)    ABSTRACT

An arrangement of devices which may be worn on the body of a person comprising a first device for transmitting signals to at least one second device via electromagnetic fields or waves, with the first device comprising a transmitter for transmitting such signals and an antenna connected to this transmitter, having a linear or chain-like, but not necessarily straight, arrangement of materials starting from the antenna, which affect the path of the electromagnetic waves or fields transmitted or produced by the antenna, such that at the location of at least one second device a higher receiving field strength of the signals transmitted by the transmitter prevails than without this arrangement of materials.

17 Claims, 2 Drawing Sheets

ARRANGEMENT OF DEVICES COMPRISING AT LEAST ONE TRANSMITTER AND METHOD FOR IMPROVING THE RECEIVING FIELD STRENGTH

CROSS REFERENCE TO RELATED APPLICATIONS

The present application claims the benefit of a provisional patent application filed on Jun. 21, 2007, and assigned application No. 60/936,615. The present application also claims priority of German application No. 10 2007 028 234.8 filed Jun. 20, 2007. Both applications are incorporated by reference herein in their entirety.

FIELD OF THE INVENTION

The invention relates to an arrangement of devices comprising at least one transmitter and a method for improving the receiving field strength.

BACKGROUND OF THE INVENTION

As a result of increasing miniaturization of electronic devices, in particular in the field of information and communication technology and the similarly increasing development in the field of wireless communication between such devices, arrangements of such devices which communicate with one another and as a result cooperate functionally in the implementation of different applications are increasingly encountered in widely varying fields of technology and the application thereof.

For example, modern hearing aids or hearing aid systems nowadays frequently consist of a plurality of devices which are arranged on the body of the wearer of the hearing aid and only allow the desired function of the hearing aid system by their functional cooperation. A few digital hearing aid systems are provided with radio technology, by means of which with a two-ear (binaural) provision, both hearing aids communicate with one another and are synchronously adapted to one another. Thus it is ensured that both devices are always set to be the same if, for example, on one side the hearing program is changed or the volume is altered. Even the control of so-called adaptive parameters, namely algorithms for detecting interference noise or the adaptation of the characteristic of directional microphones, is synchronized in both hearing systems and thus increases the localization capacity.

In typical examples of such wireless hearing aid systems of modular construction, the user wears one respective hearing aid in or behind the ears, which is connected wirelessly to the respective other hearing aid and, if required, further accessories. These accessories are frequently also worn on the body of the hearing aid wearer, typically on a cord around the neck or on the belt. Examples of such accessories are programming devices or interface devices by means of which, for example, the connection of external microphones, MP3 players or radio devices to the hearing system is possible.

The hearing aid thus converts the electromagnetic signals received by the transmitter of the accessory (for example music signals) into acoustic signals, which in the case of so-called behind-the-ear devices are coupled via a sound tube in the ear of the wearer by means of an otoplastic.

In other fields of the technology and its applications (for example patient monitoring, mobile telephones, electronic games) similar situations exist which do not have to be explained in more detail here.

The performance of such arrangements and other arrangements of devices communicating with one another wirelessly which may be worn on the body of a person depends to a great extent on the quality of the radio link or a respective further method used for wireless communication (inductive coupling, etc). The transmitter power and field strengths used in this case are more likely to be low for various reasons (power supply, interference from adjacent systems). Thus a technically optimal solution for wireless communication between the devices is important, which is intended to ensure operational reliability and a data rate which are as high as possible.

SUMMARY OF THE INVENTION

The object of the present invention is to contribute to the technically optimal solution for these problems. This object is achieved by an arrangement or a method according to one of the claims. In this case, advantageous developments of the present invention form the subject matter of the sub-claims.

BRIEF DESCRIPTION OF THE DRAWINGS

The invention is described hereinafter in more detail with reference to preferred exemplary embodiments and by means of the figures, in which.

DETAILED DESCRIPTION OF THE INVENTION

These and further exemplary embodiments of the invention are described in more detail hereinafter. In this case, this description always has a purely exemplary nature and is not intended to restrict the field of application of the invention in any way. In particular when, for the sake of simplicity and clarity of the representation, hearing aid systems are discussed hereinafter always by way of example, the person skilled in the art may easily see how the invention may be transferred in a simple manner to other applications using this description by way of example.

Figure 1:
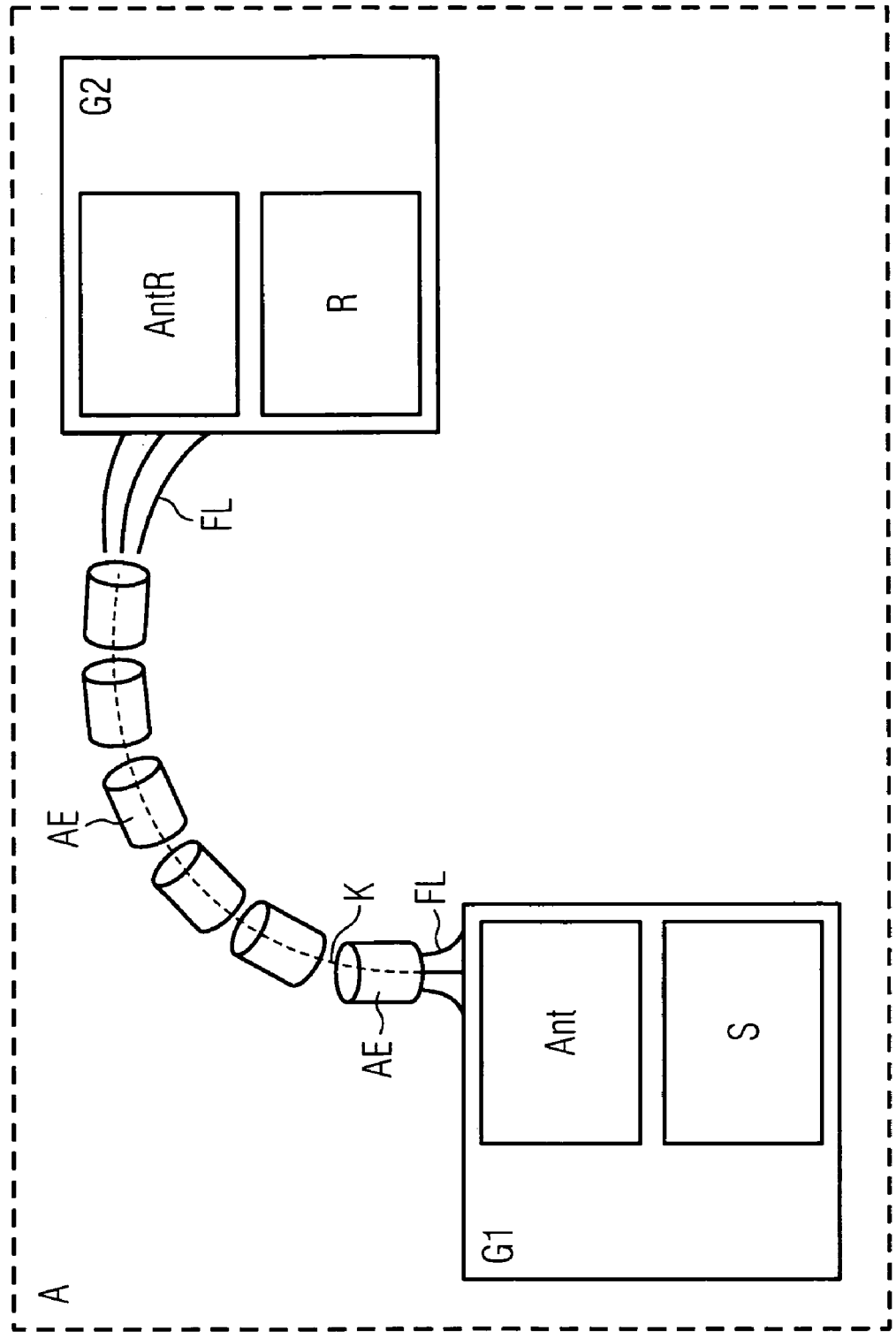
FIG. 1 shows schematically a first exemplary embodiment or a first group of exemplary embodiments of an arrangement according to the invention having, for example, two devices.

As may be clarified, amongst others, by FIG. 1, the present invention may be implemented by an arrangement (A) of devices which may be worn on the body of a person, which comprises a first device (G1) for transmitting signals to at least one second device (G2) via electromagnetic fields or waves, with the first device (G1) comprising a transmitter (S) for transmitting such signals and an antenna (Ant) connected to this transmitter (S).

Moreover, the invention provides a linear or chain-like, but not necessarily straight, arrangement (K) of materials starting from the antenna (Ant) which affect the path of the electromagnetic waves or fields transmitted or produced by the antenna (Ant), such that at the location of at least one second device (G2) a higher receiving field strength of the signals transmitted by the transmitter (S) prevails than without this arrangement (K) of materials.

The expression "arrangement able to be worn on the body of a person" does not necessarily mean that a few or even all parts of this arrangement have to be in direct contact with the human body in every case, in particular the surface of the skin or body orifices, such as the ear. This may be the case but is not in any way obligatory. In any case, this expression is intended to include, in connection with the description of the present invention, embodiments in which a few or all parts of the arrangement have no direct contact with the body but, for example, are integrated in items of clothing or decorative items such as items of jewelry, bracelets or wristwatches, belts, necklaces, earrings, bags, rucksacks, headgear, helmets, shoes, gloves or the like or be attached to or in said items of clothing or decorative items. Different components of the arrangement according to the invention may, therefore, be attached in different ways to the surface of the body or in or on different items of clothing or decorative items or integrated therein.

By the expression "starting from the antenna (Ant)" is intended to be understood that the linear or chain-like, but not necessarily straight, arrangement (K) of materials affects the path of the field lines in such a way that it is possible to guide the fields or waves between the transmitter and the receiver. This does not necessarily mean that this arrangement (K) would have to be connected to the antenna (Ant) i.e. for example connected mechanically or even galvanically. Instead, by means of this expression such arrangements are intended to be included where this is not the case, in which the arrangement (K) is therefore suitable only because of its spatial position and/or in particular as a result of the vicinity of its end points to the antenna (Ant) and/or to the receiving antennae (AntR) for affecting the fields or waves, within the meaning of the object underlying the invention.

The term "signals" is understood, in connection with the representation of the present invention, to be all types of signal in the sense of news technology and information technology, i.e. in particular control signals, programming signals, audio signals or other signals, depending on the target application and the technical field in which the invention is intended to be applied. In this case, further details about the form in which these signals are represented by the electromagnetic carrier used, (analogue, digital, coding, modulation, etc), may only be provided by the context of the application.

These signals are transmitted in the arrangement according to the invention between the first and a second device, in any case via electromagnetic fields or waves. This expression is intended expressly to encompass radio waves but also other forms of electromagnetic transmission, such as for example inductive or capacitive coupling, the technical modifications and developments thereof and generally any electromagnetic transmission method in which signals are transmitted by means of a transmitter and an antenna, via electromagnetic fields or waves. The term "antenna" is intended to encompass in this context not only antennae in the narrow sense but also coils and any conductor arrangement, which are suitable for emitting electromagnetic fields into the air or for inductive or capacitive coupling or for other forms of electromagnetic transmission.

The second device (G2) expediently uses a receiver (R) and an antenna (AntR) which is used for coupling the field lines (FL) to the receiver (R). The same applies to the two devices (G2a, G2b) of FIG. 2.

In order to guide the electromagnetic waves or fields used for transmitting signals between the transmitter and receiver, and thus to achieve optimal signal quality (characterized for example by the signal-to-interference ratio or a similar variable) at the receiver, the invention provides a linear or chain-like, but not necessarily straight, arrangement (K) of materials starting from the antenna (Ant) which affect the path of the electromagnetic waves or fields transmitted or produced by the antenna (Ant) such that at the location of at least one second device (G2) a higher receiving field strength of the signals transmitted by the transmitter (S) prevails than without this arrangement (K) of materials.

The exemplary embodiment shown schematically in FIG. 1 of the arrangement (A) of devices shows an example of such an arrangement (K) of materials, which in this case is designed as a series of arranged elements (AE). Provided these arranged elements (AE) at least partially consist of ferromagnetic material, the magnetic field lines (FL) emerging from the antenna (Ant), due to the electrodynamic properties of ferromagnetic materials, are combined by these arranged elements (AE) and guided along the linear or chain-like arrangement (K) to the antenna (AntR). Thus, due to the high permeability of ferromagnetic materials, the field lines of the magnetic induction extend within these materials considerably more densely than in the air. Therefore, a concentration of the magnetic induction lines within a ferromagnetic material is referred to. This group of exemplary embodiments of the present invention takes advantage of this effect in order to guide the fields used for the transmission of the signals from the transmitter to the receiver and thus to increase the field strength prevailing at the receiver.

One advantageous embodiment is an arrangement (A) of devices according to FIG. 1 comprising an arrangement (K) of materials which is configured as a series of arranged elements (AE), said arranged elements (AE) being designed in cylindrical form, which are enclosed by a woven fabric and bonded to one another to form a linear or chain-like, but not necessarily straight, arrangement of antenna elements. By means of this construction, an arrangement (K) may be implemented which may be easily integrated into items of clothing or decorative items, which is suitable for guiding the field between the transmitter and receiver. Due to its mechanical flexibility, this arrangement is able to be comfortably worn on the body of a person, without causing restrictions to mobility.

Figure 2:
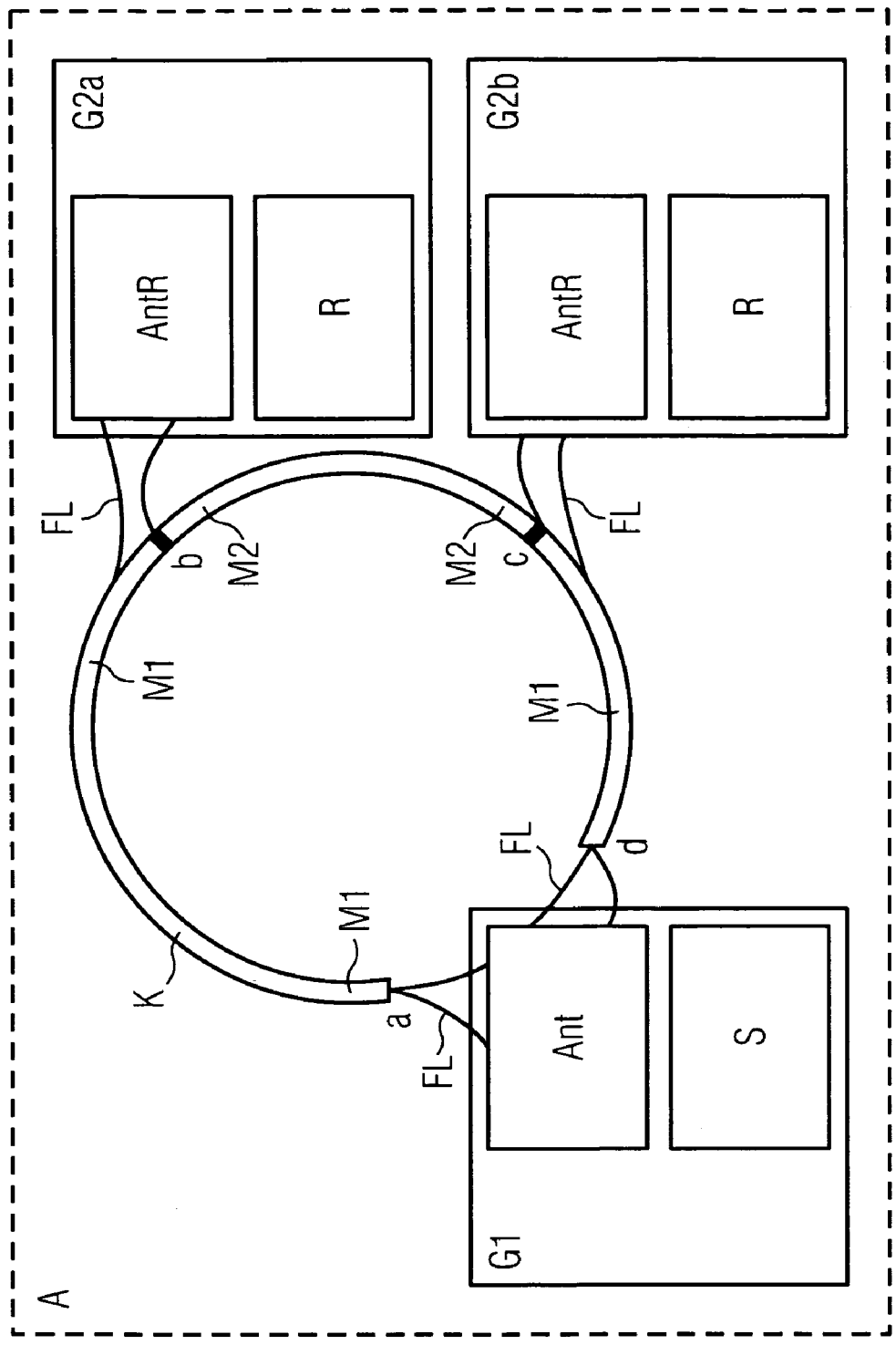
FIG. 2 shows schematically a second exemplary embodiment or a second group of exemplary embodiments of an arrangement according to the invention having, for example, three devices.

As an alternative thereto or in combination with other embodiments, an arrangement (A) of devices according to FIG. 2 may be used, with an arrangement (K) of materials which is designed wholly or partially in the form of a flexible tube, which is partially filled with ferromagnetic powder, granular material, or similar ferromagnetic material (M1) and on the other hand with a corresponding non-magnetic material (M2).

As illustrated schematically in FIG. 2, the field lines (FL) at one end (a) of the tube enter the ferromagnetic material (M1) located therein, and as a result are concentrated and are therefore guided as far as the point (b) at which they emerge again in order to able to be received by the receiving antenna (AntR) of the upper second device (G2a). Between points (b) and (c) the tube in this exemplary embodiment is not filled with a ferromagnetic material, but with a magnetically passive material (M2). The same applies to points (d) and (c) of the tube, between which in this example a ferromagnetic material is also located. This portion supplies the antenna (AntR) of the lower second device (G2b). As the material (M2) is not magnetic, the field lines are not short-circuited.

The embodiments shown by way of example in this description may also be combined with one another, so that the arrangement (K) may also consist of a combination of chains and tubes or other embodiments. Such combinations are advantageous, in particular when the linear or chain-like, but not necessarily straight, arrangement (K) of materials has a tree-type topology, or in other words, a branched structure. Such branched structures are, in particular, advantageous when a plurality of devices which are not located too closely to one another are intended to be supplied with signals. In a few situations, an arrangement (A) of devices may also be advantageous which—wholly or partially—is provided with an arrangement (K) of materials which are partially provided with a metal coating. This variant is, in particular, advantageous in high frequency radio systems.

In many cases an arrangement (A) of devices is particularly advantageous which is provided with an arrangement (K) of materials, which is designed in the form of a cord, strap, belt or a similar device on which the first device (G1) may be worn on the human body. In this case, the antenna (Ant) or, for example, the transmission coil (Ant) of the device (G1) which, for example, may be a programming device, is located in the upper part of this device, where also the cord—or more generally, the arrangement (K)—is secured. The cord, neck strap or the like may be only partially designed from ferromagnetic material and thus conduct the magnetic stray field of the coil to the second devices (G2a, G2b) which may, for example, be hearing aids.

In many practical applications it is advantageous if the arrangement (K) of materials is arranged or adapted, such that the antenna resonant circuit (ASK) of the antenna (Ant) of the first device (G1) is not noticeably unbalanced and at the same time a coupling of the arrangement (K) with the electromagnetic waves or fields to be affected is achieved which is as efficient as possible. When transmitting by means of magnetic fields, a cord (K), for example, may be attached to the left and right respectively in the vicinity of the antenna output of the ferrite antenna (Ant) or air-core coil (Ant). The distance should be sufficiently large in order not to unbalance the generally used antenna resonant circuit but not too large, i.e. close enough to pick up a sufficiently large number of field lines with the conductor. A typical distance could be, depending on the system and the transmitting frequency, 3 to 5 cm, but occasionally less or more.

Advantageously, the arrangement (K) of materials is arranged or adapted such that the field lines of the affected electromagnetic waves or fields emerge as close as possible to a receiving device of at least one second device (G2). In the examples disclosed, this means that the parts of the arrangement (K) which are provided with a ferromagnetic material, should terminate as close as possible to the receiving coils (AntR) of the second devices (G2a, G2b), it being intended that the cord (K) does not consist completely of ferromagnetic material in order to avoid short-circuiting of the field lines.

Finally, it is advantageous if the arrangement (K) of materials is arranged or adapted such that the magnetic field lines of the affected electromagnetic waves or fields emerge aligned as optimally as possible with at least one receiving coil of at least one second device (G2). This may be achieved, for example, if the location of the arrangement (K) at which the ferromagnetic material ends, is formed in a manner such that the field lines (FL) emerge such that the resulting magnetic field is aligned as optimally as possible with the receiving coils (AntR). The actual position of this location—and possibly its particularly adapted form—depends in this case on the position of the receiving coils (AntR) and may be optimized in individual cases by measurements—for example with hearing aid acoustics.

The cord or neck strap or similar arrangement (K) having ferromagnetic material, mentioned in a few examples, may for example be produced in the following manner:

the material could be present in the form of chain links, from which a chain is then produced which is joined together but movable. One portion of the chain links is thus made from ferromagnetic material and one portion from magnetically neutral material.

a flexible tube could also be used which, for example, is filled with ferromagnetic powder and partially with non-magnetic powder.

small cylindrical ferrites could be used and small non-magnetic cylinders and these parts may be enclosed by a woven fabric and flexibly bonded.

The specific choice of material for the cord or neck strap—suitable for the radio system used—permits a guiding of the electromagnetic field, which permits data transmission between the hearing aids and the device worn around the neck. As a result, the signal quality is improved. Thus the error rate is reduced on the channel and the user data rate increases. The effects of disruptive environmental conditions, such as for example interference fields, metal surfaces, etc., are also reduced. As a result, the range between the transmitter and receiver may also be increased.

The invention claimed is:

1. An arrangement of devices to be worn on a body of a person, comprising:
    a first device comprising:
        a transmitter that transmits a signal, and
        an antenna connected to the transmitter that produces an electromagnetic field;
    a second device that receives the signal via the electromagnetic field; and
    an arrangement of materials starting from the antenna that affects a path of the electromagnetic field and provides a higher receiving field strength of the signal than without the arrangement of materials at a location of the second device.

2. The arrangement of devices as claimed in claim 1, wherein the arrangement of materials comprises a series of arranged elements.

3. The arrangement of devices as claimed in claim 2, wherein the elements comprise ferromagnetic material.

4. The arrangement of devices as claimed in claim 2, wherein the elements are cylindrical and enclosed by a woven fabric and bonded to one another to form an arrangement of antenna elements.

5. The arrangement of devices as claimed in claim 1, wherein the arrangement of materials is a wholly flexible tube or a partially flexible tube.

6. The arrangement of devices as claimed in claim 5, wherein the tube is partially filled with a material selected from the group consisting of: ferromagnetic powder, granular material, and non-magnetic material.

7. The arrangement of devices as claimed in claim 1, wherein the arrangement of materials comprises a metal coating.

8. The arrangement of devices as claimed in claim 1, wherein the arrangement of materials is selected from the group consisting of: a cord, a strap, and a belt.

9. The arrangement of devices as claimed in claim 1, wherein the arrangement of materials is linear or chain-like.

10. An arrangement of materials for an arrangement of devices to be worn on a body of a person, comprising:
    a series of arranged elements that:
        affects a path of an electromagnetic field generated by a first device for transmitting a signal to a second device, and
        provides a higher receiving field strength of the signal than without the arrangement of materials at a location of the second device.

11. The arrangement of materials as claimed in claim 10, wherein the elements comprise ferromagnetic material.

12. The arrangement of materials as claimed in claim 10, wherein the elements are cylindrical and enclosed by a woven fabric and bonded to one another to form an arrangement of antenna elements.

13. A method for providing an arrangement of devices to be worn on a body of a person, comprising
- arranging a first device to the arrangement comprising an antenna for transmitting a signal;
- arranging a second device to the arrangement for receiving the signal via an electromagnetic field generated by the antenna; and
- arranging materials starting from the antenna for affecting a path of the electromagnetic field and providing a higher receiving field strength of the signal than without the arrangement of materials at a location of the second device.

14. The method as claimed in claim 13, wherein the arrangement of materials is arranged to balances an antenna resonant circuit of the antenna.

15. The method as claimed in claim 13, wherein the arrangement of materials is arranged to efficiently couple the arrangement of materials to the electromagnetic field.

16. The method as claimed in claim 13, wherein the arrangement of materials is arranged to closely emerge field lines of the electromagnetic, field to a receiving device of the second device.

17. The method as claimed in claim 13, wherein the arrangement of materials is arranged to alignedly emerge field lines of the electromagnetic field to a receiving device of the second device.

* * * * *